United States Patent [19]

Moore

[11] 4,382,481
[45] May 10, 1983

[54] DUAL FAN ENGINE COOLING SYSTEM
[75] Inventor: R. Dale Moore, Wheaton, Ill.
[73] Assignee: Dresser Industries, Inc., Dallas, Tex.
[21] Appl. No.: 230,978
[22] Filed: Feb. 2, 1981
[51] Int. Cl.³ .............................................. B60K 11/00
[52] U.S. Cl. ................................ 180/54 A; 180/68 R
[58] Field of Search .......................... 180/54 A, 68 R;
416/124–127; 123/41.49, 41.7, 41.65, 41.66, 41.57; 165/41, 42

[56] References Cited
U.S. PATENT DOCUMENTS

| | | | |
|---|---|---|---|
| 3,918,547 | 11/1975 | Kramer et al. | 180/68 R |
| 3,978,938 | 9/1976 | Joscher et al. | 180/68 R |
| 4,086,976 | 5/1978 | Holm et al. | 180/54 A |
| 4,114,714 | 9/1978 | Fachbach et al. | 180/54 A |
| 4,116,269 | 9/1978 | Ikeda | 180/54 A |
| 4,173,995 | 11/1979 | Beck | 180/54 A |

FOREIGN PATENT DOCUMENTS

| | | | |
|---|---|---|---|
| 2402154 | 8/1974 | Fed. Rep. of Germany | 123/41.65 |
| 658085 | 5/1929 | France | 123/41.49 |

Primary Examiner—Joseph F. Peters, Jr.
Assistant Examiner—Kenneth R. Rice
Attorney, Agent, or Firm—J. N. Hazelwood; B. E. Deutsch

[57] ABSTRACT

A tractor type motor vehicle is provided with a two compartment front end assembly, one compartment being an engine enclosure and the second compartment being a heat exchanger compartment. Each compartment is evacuated by a separate fan that directs air to a common discharge opening between the two compartments. Improved cooling and noise control are realized by the utilization of the invention.

10 Claims, 4 Drawing Figures

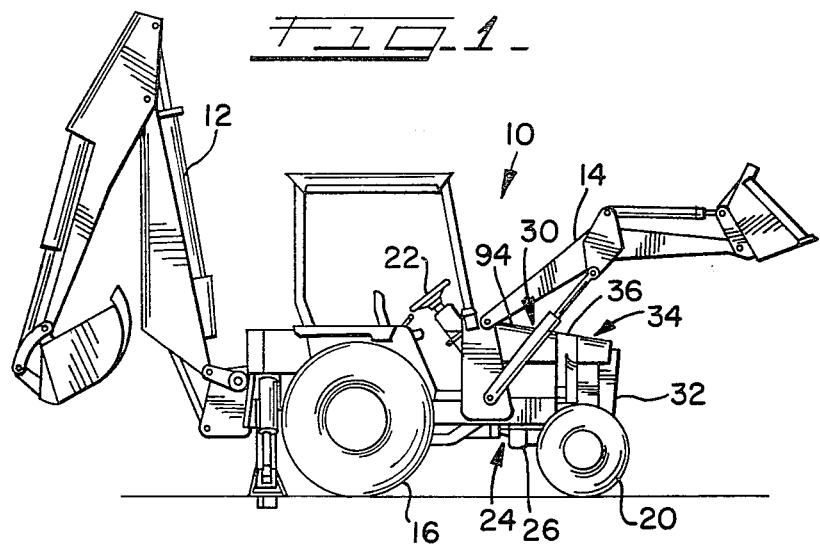
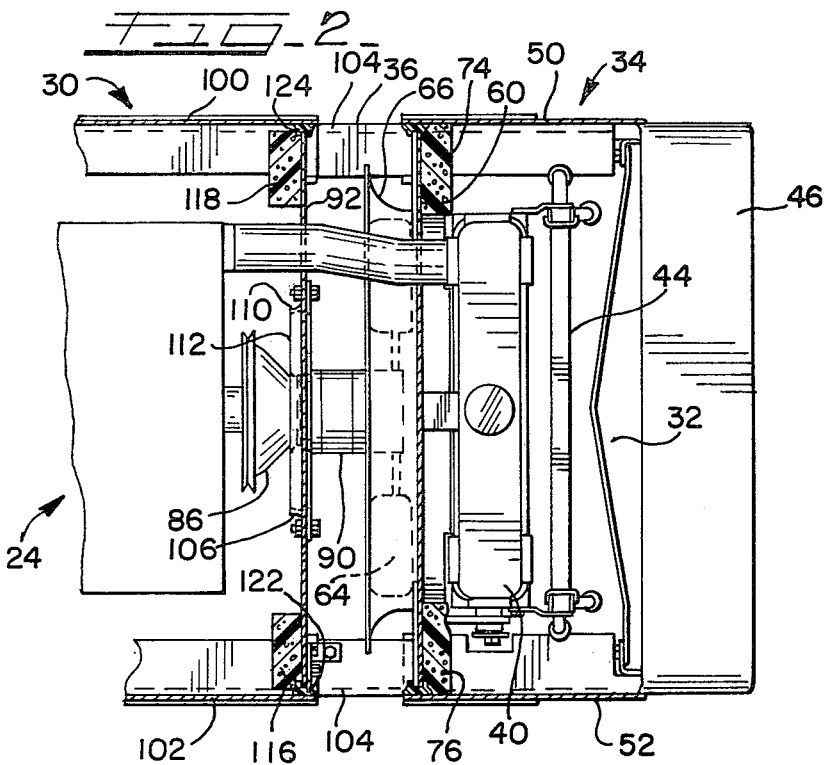

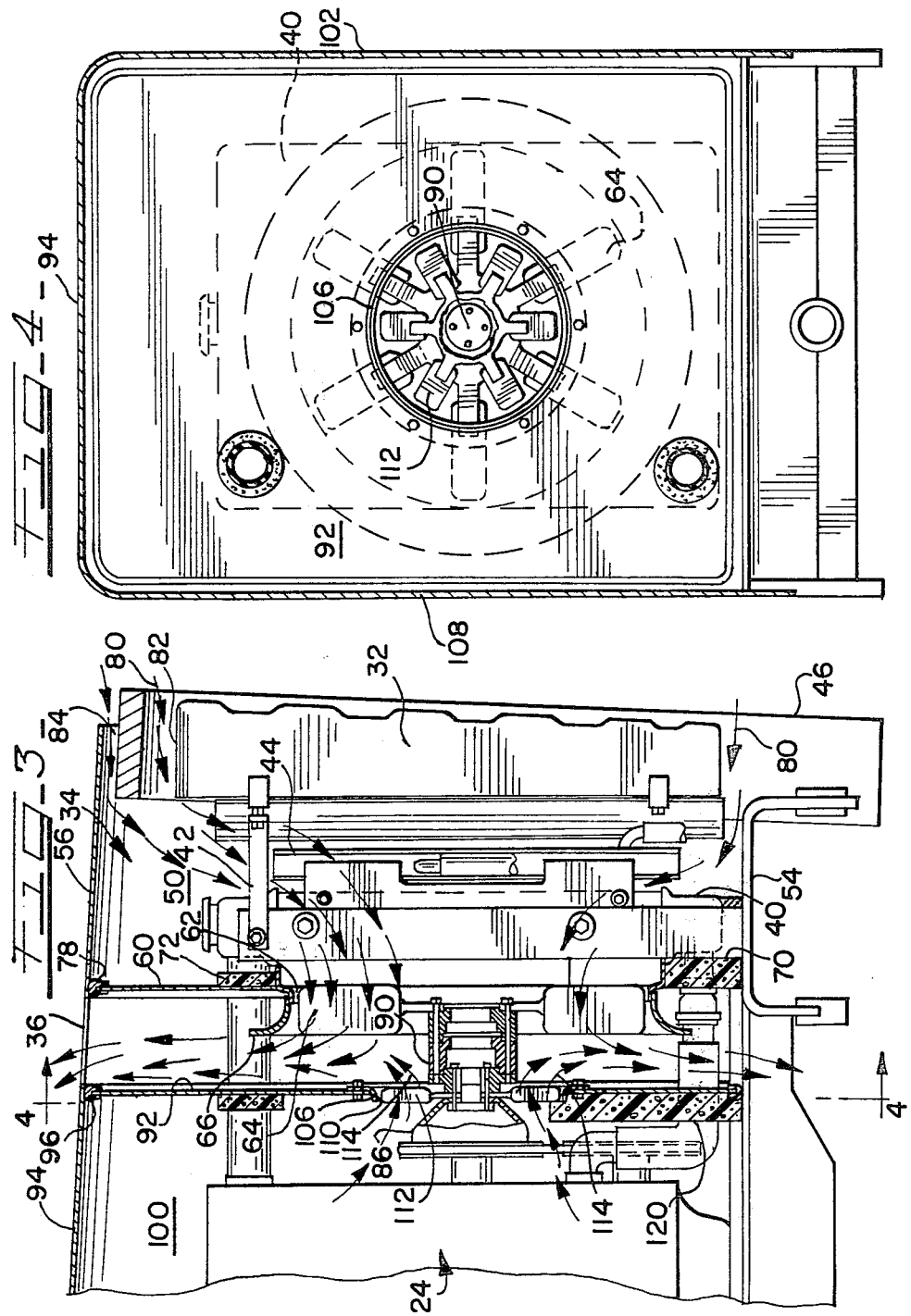

DUAL FAN ENGINE COOLING SYSTEM

BACKGROUND OF THE INVENTION

1. Field of the Invention

This invention is concerned with a self-propelled vehicle engine cooling system. More particularly the invention relates to utilization of separate chambers for enclosing the engine and various heat exchangers. Each compartment is evacuated by a fan directing air flow to an air discharge opening between the separate engine and heat exchanger chambers.

2. Description of the Prior Art

Almost since the advent of water cooled motor vehicles the radiator and engine layout has been relatively consistent with the radiator or heat exchanger at the front end of the vehicle and the engine located between the heat exchanger and the passenger compartment. Of course there have been many alternative layouts, especially in early vehicles and buses, but in general and particularly in the working machine, i.e., tractor art, the layout has been conventional.

In this age of environmental enlightenment, industry sees the need to provide quiet running machines both for compliance with "noise pollution" regulations and to offer the customer the benefit of a quiet machine. Early developments were simple endeavors where technicians would position noise barriers around sources of noise—typically the vehicle engine compartment including the heat exchanger fan. Of course noise was thereby controlled to a degree but engine compartment cooling emerged as a problem due to restricted air flow around the engine.

A solution to the noise and cooling problem is presented in U.S. Pat. No. 4,086,976 entitled "Isolated Clean Air Chamber and Engine Compartment in a Tractor Vehicle," wherein an enclosed engine compartment is plumbed to an evacuation duct and engine heated air is blown out the front of the tractor vehicle. A single fan also pulls air through the radiator and pushes it out the grille opening. Although this embodiment represents a departure from more conventional/heat exchanger layouts it is significantly different from the instant invention as the instant invention incorporates two separate chambers, one for the engine and the second for the coolant heat exchangers as well as two fans providing flow from respective chambers to a centrally located discharge opening.

One advantage of this invention over the prior art is that the device provides for a sound insulated engine compartment that is segregated from the vehicle's heat exchangers and is evacuated through the use of a small fan, in conjunction with a sound insulated heat exchanger compartment evacuated by a large fan such that both fan noise and engine temperature are controlled.

An object of the invention is to provide for engine compartment air flow sufficient to minimize heat build up in the engine compartment.

Another object of the invention is to provide for a sound insulated heat exchanger compartment that allows sufficient air flow through the heat exchangers while minimizing the measured noise pressure level at the front of the tractor.

Also an object of the invention is to provide a central air discharge port located between the engine and the vehicle's heat exchanger where air from both the small fan and the large heat exchanger fan can be comingled and forcably exhausted in a general radial pattern.

Another object of the invention is to allow the almost complete enclosure of the engine compartment except for judiciously placed openings required to supply air to the engine compartment.

Also an advantage of this invention is that the engine compartment resident components are not subjected to the high velocity stream of air borne debris usually associated with a conventional fan. Therefore the engine compartment and the engine may stay cleaner and drier than would contemporary conventional engine compartment layouts.

SUMMARY OF THE INVENTION

A self propelled tractor type vehicle is provided with a bifucated forward section wherein the vehicle's engine is housed in a sound insulated enclosure and the vehicle's engine coolant heat exchanger is housed in a second and independent sound insulated enclosure.

The engine compartment enclosure is generally a continuous envelope with some intake areas provided for the entry of ambient air as well as an opening aligned with a small engine compartment evacuation fan.

The heat exchanger enclosure is also a continuous envelope with intake areas provided at the front and a relatively large aperture on the engine side of the heat exchanger enclosure through which air may be drawn from the enclosure by the heat exchanger fan.

Both the small engine compartment evacuation fan and the heat exchanger fan are driven off a common shaft typically driven by the vehicle's engine. The fans deliver their output to a central air discharge opening where the now heated ambient air is discharged in a generally radial distribution pattern to the environment. The air distribution pattern is improved through the use of a radial flow fan shroud that modifies the normal fan discharge pattern by causing a radially outward flow of discharge air. Both fans of the preferred embodiment may utilize the flow improving fan shroud although it is more important that the heat exchanger fan be equipped with a radial fan shroud.

BRIEF DESCRIPTION OF THE DRAWING FIGURES

The invention is embodied in the accompanying figures wherein:

FIG. 1 is a side elevation view of a tractor vehicle incorporating the invention;

FIG. 2 is a top view of the front portion of the vehicle having the hood sheet removed and underlying components sectioned;

FIG. 3 is a sectioned side elevation view of the front portion of the tractor; and FIG. 4 is a cross-sectioned view through 4—4 of FIG. 3.

DETAILED DESCRIPTION OF THE INVENTION

The vehicle chosen to represent an embodiment of the invention is the tractor vehicle generally 10 having supplemental equipment mounted thereon including a backhoe mechanism 12 and a front mounted loader 14. The tractor generally 10 is conventionally supported on four ground engaging tire/wheel assemblies such as 16 and 20. The operator would occupy the operator's work zone 22.

In the FIG. 1 embodiment an engine generally 24 is enclosed in an engine compartment enclosure generally 30 having an open bottom portion through which the engine oil pan 26, as well as other projecting equipment, protrudes.

The embodiment shown includes a front mounted fuel tank 32 at the leading section of a heat exchanger enclosure generally 34 that is independent of the engine compartment enclosure generally 30 and separated therefrom by a discharge opening 36.

The basic operation of the tractor cooling system is that ambient air will be drawn in through the front of the heat exchanger enclosure generally 30 and exhausted out the discharge opening 36. Air flow will simultaneously be drawn from the engine compartment and also exhausted out the discharge opening.

FIGS. 2 through 4 clearly illustrate the principle of the invention in the tractor embodiment. In these figures the front portion of the tractor, incorporating the heat exchanger enclosure generally 34, includes an engine coolant heat exchanger 40 that is supported by mounting means such as 42 (of FIG. 3) to, for example, a fuel tank 32. A lubricant heat exchanger 44 is mounted between the fuel tank 32 and the engine coolant heat exchanger 40.

In the embodiment shown, which is a construction equipment vehicle, a front collar 46 of substantial proportions is welded to the frame of the vehicle and surrounds the fuel tank 32, but allows clearance for air passage between the tank and front collar 46.

The front location of the fuel tank 32 aids in noise attenuation by suppression of noise pressure emanating from the front of the vehicle.

Side sheets 50 and 52 enclose the sides of the heat exchanger enclosure generally 34. These side sheets extend from a lower frame member, typically axle bolster 54, which serves inter alia to enclose the bottom of the heat exchanger enclosure. If a design is contemplated where the axle bolster won't enclose the bottom of the compartment a panel could be alternatively used. The top sheet 56 covers the top of the heat exchanger enclosure by extending between the left 50 and right 52 side sheets while leaving a gap between the top of the front collar 46 and the forward edge of the top sheet also providing an air passage to allow air to enter the heat exchanger compartment. The top sheet extends from the discharge opening 36 forwardly to its front edge near the front of the vehicle.

The heat exchanger compartment could be provided with other air entry passages to augment or supplement those shown in the drawing figures.

The rearmost barrier 60 of the heat exchanger enclosure extends generally from the top sheet 56 to the axle bolster 54 and from respective side sheets 50 and 52. The rearmost barrier 60 is not continuous but is perforated as necessary to accommodate coolant lines from the engine generally 24 and further is provided with a large aperture, or heat exchanger compartment discharge port 62 to accommodate the heat exchanger fan 64. The aperture 62 incorporates a guide surface known as a radial fan shroud 66 that will cause air being drawn from the heat exchanger enclosure 34 to be radially discharge through the discharge opening 36.

Foam insulation components 70, 72, 74 and 76 may be used around the inside surface of the rearmost barrier 60 of the heat exchanger compartment to absorb noise generated by the fan operation and seal the perimeter of the rearmost barrier to prevent the escape of air from the heat exchanger compartment before it has passed through the heat exchanger. Rubber sealing strip 78 may contact the top sheet 56. The barriers and foam insulation also serve to prevent recirculation of heated air back through the heat exchanger after it has been drawn out by the heat exchanger suction fan 64.

FIG. 3 in particular sets forth the air flow pattern through the heat exchanger enclosure 34 where the air flow is represented by the flow pattern lines having arrowheads such as 80. It can be seen that the air is induced to flow inwardly around the top 82 of the fuel tank 32 between the tank and the inside surface of the front collar 46. As the tank 32 will be smaller in the exterior frontal dimensions than the inside dimensions of the front collar 46 air flow will also be drawn around the vertical sides of the tank as well as from around the top and bottom of the tank as shown in FIG. 3. Air flow will also be induced to flow through the uppermost opening 84 between the top sheet 56 and the top of the front collar 46. After entering the heat exchanger enclosure generally 34 the fresh ambient air will be drawn first through the lubricant heat exchanger 44 and then through the engine coolant heat exchanger 40 by the heat exchanger fan 64 which is set up as a suction type fan. The heat exchanger fan 64 is driven by the vehicle engine generally represented as 24 through shaft mounted pulley 46 having extension coupling 90. This fan as well as the engine compartment evacuation fan 112 may be carried by a common shaft. Of course the fan could alternatively be driven by electric or hydraulic motors thus precluding the need for direct communication with the engine. As the air is drawn out of the heat exchanger compartment it will be induced, primarily by the flow inducing shape of the radial fan shroud 66, to flow outwardly from the discharge opening 36. Flow from the heat exchanger compartment will also be influenced by its impingement on the front wall 92 of the engine compartment enclosure generally 30.

The engine compartment enclosure generally 30 includes a hood sheet 94 (FIG. 3) which terminates at its forward end at the juncture with the front wall 92 of the engine compartment enclosure. Sealing strip 96 serves to prevent direct metal-to-metal contact between the hood sheet 94 and the front wall 92. Side walls, left 100 and right 102, (FIG. 2) extend vertically upwardly from the vehicle frame 104 to the hood sheet 94 (or downwardly from the hood sheet) and may, in fact, be a continuation of the hood sheet as shown in FIG. 4. The hood sheet 94 and the side walls 100 and 102 extend rearwardly from the discharge opening 36 to the firewall (not shown) of the vehicle to seal the top and sides of the engine compartment. The bottom of the engine compartment may be open, however, in a preferred embodiment it will be provided with a belly pan having apertures in selected optimized locations to provide the entry of cooling air flow.

The front wall 92 of the engine compartment has various apertures therein to accommodate necessary plumbing as would be expected. The significant aperture in the front wall 92 is the fan port 106 concentrically aligned with the large aperture 62 in the rear barrier of the heat exchanger rearmost barrier 60. This fan port 106 may also be provided with a small flow inducing fan shroud 110 that surrounds the engine compartment evacuation fan 112. The engine compartment evacuation fan 112 is driven by the engine through the shaft mounted pulley 86 on the extension coupling 90.

Air flow is induced through the engine compartment enclosure generally 30 by the engine compartment evacuation fan 112, the flow being symbolized by arrows such as 114. The fan 112 forces the air into the discharge opening 36 where it comingles with the air from the heat exchangers and is exhausted out the discharge opening 36.

Both the engine compartment evacuation fan and the heat exchanger fan are axially aligned or alternatively may be positioned to give optimum air flow from their respective chambers.

Some insulating foam such as 116, 118, 120 and vibration control strips 122 and 124 may be used in the interior of the engine compartment enclosure for sound, vibration and air leakage control.

Another embodiment is envisioned where the fuel tank would not be mounted in the front of the radiator but would be placed behind the operator's work station as is common in contemporary farm tractors. In this alternative the front area of the heat exchanger 40 would be protected by a conventional grille assembly or a sound attenuating perforated or non-perforated panel acting as a grille.

As a point of clarification it should be recognized that only the critical or explanatory elements of the structure have been assigned reference characters. Other elements not necessarily important to the teaching of the invention, such as the coolant hoses and engine details, have not been discussed due to their conventionality. Furthermore, the inventor contemplates numerous possible layout alternatives such as a conventional front grille opening displacing the front mounted fuel tank, the use of the invention in farm tractors, fork lift trucks, stationary engines as well as other applications. Furthermore, design nuances such as the structure of the compartment enclosure are also contemplated.

What is claimed is:

1. In a motor vehicle having a fluid cooled engine the improvement comprising:
   an engine compartment sound-reducing enclosure of said motor vehicle attenuating noise emanating therefrom and having a front wall with a fan port and an air intake aperture;
   a heat exchanger sound-absorbing and air flow guiding enclosure of said motor vehicle spaced horizontally away from said engine compartment enclosure, said heat exchanger enclosure having a rearmost barrier provided with a heat exchanger compartment discharge port and air entry passages;
   a discharge opening located between said engine compartment enclosure and said heat exchanger enclosure communicating with said fan port of said engine compartment enclosure and said heat exchanger compartment discharge port;
   an engine compartment evacuation fan mounted for rotation within said fan port of said engine compartment enclosure for inducing air flow therefrom through said fan port to said discharge opening; and
   a heat exchanger fan mounted for rotation within said heat exchanger compartment discharge port for inducing air flow through said heat exchanger compartment discharge port from said heat exchanger compartment to said discharge opening;
   whereby said air flows from said engine compartment and said heat exchanger compartment impinge upon and blend with each other for conjoint discharge through said discharge opening.

2. The invention in accordance with claim 1, wherein said engine compartment enclosure of said motor vehicle further comprises:
   a hood sheet terminating at a forward end thereof at said front wall;
   a left sidewall extending downwardly from said hood sheet;
   a right side wall extending downwardly from said hood sheet; and
   a belly pan having at least a single aperture in a selected location allowing entry of air to said engine compartment enclosure.

3. The invention in accordance with claim 1, wherein said heat exchanger enclosure further comprises:
   a top sheet extending forwardly from said discharge opening to a front edge of said top sheet;
   a left side sheet extending downwardly from said top sheet;
   a right side sheet extending downwardly from said top sheet; and
   a panel at a bottom section of said heat exchanger enclosure;
   wherein a noise attenuation panel describing a front grille assembly is located opposite said rearmost barrier generally between said top sheet, said side sheets and said panel.

4. The invention in accordance with claim 1, wherein said engine compartment evacuation fan and said heat exchanger fan are each driven fans drawing air toward each other from respective engine compartment and heat exchanger compartment and further are axially aligned.

5. The invention in accordance with claim 4, wherein said heat exchanger compartment discharge port and said fan port of said engine compartment enclosure are each provided with independent flow guiding radial fan shrouds whereby air flow will be induced to flow radially outwardly from said ports.

6. The invention in accordance with claim 1, wherein said heat exchanger compartment discharge port is provided with a flow guiding radial fan shroud whereby air flow will be induced to flow radially outwardly from said discharge opening.

7. In a tractor vehicle having a fluid cooled engine supported on a frame the improvement comprising:
   an engine compartment enclosure having a front wall with a fan port, a hood sheet terminating at a forward end thereof at said front wall, left and right sidewalls extending from said tractor frame to said hood sheet;
   a heat exchanger enclosure mounted on said frame enclosing a heat exchanger of said tractor vehicle, said enclosure spaced horizontally away from said engine compartment enclosure and having a rearmost barrier provided with a heat exchanger enclosure discharge port including a radial discharge fan shroud, a top sheet, left and right side sheets extending downwardly from said top sheet to said frame, a panel closing the bottom of said heat exchanger enclosure and a noise attenuation panel describing a front grille assembly opposite said rearmost barrier;
   a discharge opening located between said engine compartment enclosure and said heat exchanger enclosure communicating with said fan port of said engine compartment enclosure and said heat exchanger enclosure discharge port;

a pair of engine driven fans axially aligned including a heat exchanger fan located in said heat exchanger enclosure discharge port drawing air from said heat exchanger enclosure and an engine compartment evacuation fan located in said fan port drawing air from said engine compartment enclosure, each fan delivering air toward each other and thereafter to said discharge opening;

said engine compartment fan being larger than said heat exchanger fan.

8. The invention in accordance with claim 7, wherein said fan port of said engine compartment enclosure is provided with a flow inducing radial fan shroud whereby air flow will be induced to flow radially outwardly from each of said fan port and said heat exchanger discharge port.

9. The invention in accordance with claim 7, wherein said engine compartment enclosure includes a belly pan having at least a single aperture in a selected location allowing entry of air to said engine compartment enclosure;

wherein said pair of fans are carried on a common shaft.

10. In a tractor vehicle having a fluid cooled engine supported on a frame, a front mounted fuel tank carried on said frame and a front collar extending upwardly from said frame at the front of the tractor and surrounding said fuel tank, the improvement comprising:

an engine compartment enclosure surrounding said fluid cooled engine and supported by said frame, said engine compartment enclosure having a front wall with a fan port, a hood sheet terminating at a forward end thereof at said front wall, left and right sidewalls extending from said tractor frame to said hood sheet;

a heat exchanger enclosure mounted on said frame enclosing at least a single heat exchanger of said tractor vehicle, said enclosure spaced horizontally away from said engine compartment enclosure and having a rearmost barrier provided with a heat exchanger enclosure discharge port including a radial discharge fan shroud, a top sheet extending over and spaced away from said front collar, left and right side sheets extending downwardly from said top sheet to said frame and between said front collar and said rearmost barrier, a panel closing the bottom of said heat exchanger enclosure and said fuel tank constituting a noise attenuation barrier opposite said rearmost barrier of said heat exchanger enclosure;

a discharge opening located between said engine compartment enclosure and said heat exchanger enclosure communicating with said fan port of said engine compartment enclosure and said heat exchanger enclosure discharge port; and a pair of driven fans axially aligned including a heat exchanger fan located in said heat exchanger enclosure discharge port drawing air from said heat exchanger enclosure and an engine compartment evacuation fan located in said fan port drawing air from said engine compartment enclosure, each fan delivering air to said discharge opening;

wherein said fan port of said engine compartment enclosure is provided with a flow inducing radial fan shroud whereby air flow will be induced to flow radially outwardly from each of said fan port and said heat exchanger discharge port;

wherein said engine compartment enclosure includes a belly pan having at least a single aperture in a selected location allowing entry of air to said engine compartment enclosure.

* * * * *